United States Patent [19]
Johno et al.

[11] Patent Number: 5,367,391
[45] Date of Patent: Nov. 22, 1994

[54] METHOD FOR DRIVING AN ANTIFERROELECTRIC LIQUID CRYSTAL CELL

[75] Inventors: Masahiro Johno, Tsukuba; Tomoyuki Yui, Nagareyama, both of Japan

[73] Assignee: Mitsubishi Gas Chemical Co., Inc., Tokyo, Japan

[21] Appl. No.: 24,762

[22] Filed: Mar. 2, 1993

[30] Foreign Application Priority Data

Mar. 3, 1992 [JP] Japan .................. 4-045507

[51] Int. Cl.$^5$ .................. G02F 1/137; G02F 1/1343
[52] U.S. Cl. .................. 359/56; 359/84; 345/96; 345/97
[58] Field of Search .......... 359/84, 100, 56; 345/97, 96

[56] References Cited

U.S. PATENT DOCUMENTS

| | | | |
|---|---|---|---|
| 5,078,477 | 1/1992 | Sono et al. | 359/91 |
| 5,108,650 | 4/1992 | Koden et al. | 359/103 |
| 5,110,498 | 5/1992 | Suzuki et al. | 252/299.66 |
| 5,202,054 | 4/1993 | Suzuki et al. | 252/299.61 |
| 5,207,946 | 5/1993 | Numazawa et al. | 252/299.65 |
| 5,207,947 | 5/1993 | Suzuki et al. | 252/299.67 |
| 5,243,455 | 9/1993 | Johnson et al. | 359/93 |
| 5,262,086 | 11/1993 | Suzuki et al. | 252/299.65 |

FOREIGN PATENT DOCUMENTS 0422904 4/1991 European Pat. Off. .

OTHER PUBLICATIONS

Chandani et al, "Novel Phases Exhibiting Tristable Switching", Jul. 1989, JJ of Applied Physics, vol. 28 No. 7.

Johno et al, "Temporal and Spatial Behavior of the Field Induced Transition Between Anti-ferroelectric and Ferroelectric Phases in Chiral Smectics", JJ of Applied Physics, vol. 29 #1, Jan. 1990.

J. Lee, et al. "Frequency-Dependent Switching Behavior under Triangular Waves . . . ", Japanese Journal of Applied Physics, vol. 29, 6 Jun. 1990.

Y. Yamada, et al. "Ferroelectric Liquid Crystal Display Using Tristable Switching", Japanese Journal of Applied Physics, vol. 29, Sep. 1990.

A. Chandani, et al. "Tristable Switching in Surface Stabilized . . . ", Japanese Journal of Applied Physics, vol. 27, May 1988.

N. Yamamoto, et al. "Switching Properties in Antiferroelectric Liquid Crystals" Japanese Journal of Applied Physics, vol. 30, Sep. 1991.

*Primary Examiner*—William L. Sikes
*Assistant Examiner*—Kenneth Parker
*Attorney, Agent, or Firm*—Sherman and Shalloway

[57] ABSTRACT

A method for driving an antiferroelectric liquid crystal cell suitable for a simple-matrix display, "utilizing" third state →uniform state and "uniform state→third state" switchings, in which the uniform state to third state switching is done within a memory time of uniform to third state switching. The uniform states are employed as the light and dark states.

7 Claims, 3 Drawing Sheets

METHOD FOR DRIVING AN ANTIFERROELECTRIC LIQUID CRYSTAL CELL

FIELD OF THE INVENTION

The present invention relates to methods for driving antiferroelectric liquid crystal cells for use in liquid crystal display devices and liquid crystal light shutters, etc., and more specifically to novel methods for driving antiferroelectric liquid crystal cells improving display characteristics.

BACKGROUND OF THE INVENTION

In recent years, electro-optic devices using ferroelectric liquid crystals have attracted increasing attention. An electro-optic device using a ferroelectric liquid crystal is characterized by its extremely highspeed response, bistability and the like, as compared with a conventional electro-optic device using a nematic liquid crystal. As an electro-optic device capable of exhibiting such characteristics associated with a ferroelectric liquid crystal, a surface stabilized ferroelectric liquid crystal (hereinafter referred to as SSFLC) cell is available. This cell was developed by Clark et al. (Japanese Laid-Open Patent Publication No. 107216/81), and is said to be a cell which is most expected to be put to practical use.

A SSFLC cell is characterized in that when a ferroelectric liquid crystal is retained in a cell (haying a cell gap of about 0.5–2 μm) which is so thin as to enable to a helical structure thereof to disappear, bistable states of liquid crystal molecules manifest themselves. In other words, under two stable states, the liquid crystal molecules are in uniform states which differ in the direction of a director being a unit vector in the direction of a long axis of the liquid crystal molecule. Since the ferroelectric liquid crystal has spontaneous polarization and bistability as mentioned above, high-speed response and memory characteristics can be obtained. Therefore, its application to a high-density large-screen display and a high-speed light shutter, etc., has been studied. And great progress has been made in the study of SSFLC cells utilizing said bistable states, with the recent development of liquid crystal materials.

However, there remain some problems with the SSFLC cells which have yet to be solved. For example, there are problems related to orientation reliability and sticking. Once an SSFLC cell is thrown into orientation disorder by a physical shock, etc., it is impossible to readily make an orientation recovery, unlike a nematic liquid crystal cell. Therefore, a great deal of studies have been made of methods for producing a display panel having resistance to any physical shock, but they have not yet succeeded in obtaining such reliability as in the case of a nematic liquid crystal. Furthermore, sticking is a phenomenon in which an image written on a liquid crystal display remains for an indefinite time, and is said to be a ghost-effect. The cause of sticking lies in the spontaneous polarization of a ferroelectric liquid crystal. In other words, sticking is a problem that cannot be avoided as long as a ferroelectric liquid crystal is used. Researches for avoiding sticking have also been made extensively, but a solution to the problem has not been found as yet.

Moreover, researches have been made on a liquid crystal cell (antiferroelectric liquid crystal cell) utilizing a liquid crystal having an antiferroelectric phase (hereinafter referred to as an antiferroelectric liquid crystal) recently discovered as a novel smectic phase (Japanese Journal of Applied Physics, Vol. 27, pp. L729-L732, 1988), which is different from said ferroelectric liquid crystal. This cell is characterized by its capability of performing tristable switching, its distinct threshold characteristic, its good memory characteristic and the like. FIG. 1 shows the relationship between applied voltage and tilt angle in the case of an antiferroelectric liquid crystal cell. It can be perceived from this figure that there are three stable states in an antiferroelectric liquid crystal cell. That is, they are two uniform states (Ur, Ul) as observed in ferroelectric liquid crystal cells, and the third state. It has been reported by Chandani et al. that this third state is a manifestation of the antiferroelectric phase (Japanese Journal of Applied Physics, Vol. 28, pp. L1261-L1264, 1989).

Thus, in an antiferroelectric liquid crystal cell, switching occurs between three stable states. Furthermore, in FIG. 1, for example, in case positive voltage is gradually applied, a change in tilt angle occurs in the sequence of A-B-C-D. The tilt angle hardly changes when the applied voltage is between 0(V) and $V_1(V)$, but greatly changes when the applied voltage exceeds $V_1(V)$. Next, in case the voltage is gradually lowered, the tilt angle changes in the sequence of D-E-F-A. In this case, it greatly changes when the applied voltage becomes less than $V_2(V)$. The same applies to the case of negative voltage application. Thus, the antiferroelectric liquid crystal cell has distinct thresholds with respect to applied voltage. Moreover, from the fact that threshold $V_1(V)$ in the voltage-raising step is different from threshold $V_2(V)$ in the voltage-lowering step, it can be perceived that the antiferroelectric liquid crystal cell has a memory characteristic. In fact, for driving a cell utilizing a memory characteristic, it is necessary to apply pulsed voltage to the cell, in addition to bias voltage, as suggested by Chandani et al (Japanese Journal of Applied Physics, Vol. 27, pp. L729-L732, 1988). In this case, it is possible to perform switching within the memory characteristic between the third state and a uniform state.

The most important reason why attention has currently been riveted upon antiferroelectric liquid crystals is that they are expected to be used as liquid crystals with which the various problems of ferroelectric liquid crystals can be all resolved. For example, an antiferroelectric liquid crystal has a self-recovery function for orientation, whereby orientation reliability is greatly enhanced, as compared with a ferroelectric liquid crystal. Also, there is no permanent spontaneous polarization in the antiferroelectric liquid crystal, and therefore, the phenomenon of sticking can be avoided. However, there still exist many problems which remain to be solved regarding the antiferroelectric liquid crystal. Such problems include those related to response time and tilt angle. In the case of the antiferroelectric liquid crystal, it is possible to perform three types of switching. That is, they are "third state→uniform state", "uniform state→third state" and "uniform state→uniform state" switchings. For drive by means of utilizing a memory characteristic, it is necessary to perform switching between the third state and a uniform state, as mentioned above. But, as investigated in Japanese Journal of Applied Physics, Vol. 30, pp. 2380-2383, 1991, the response time generally decreases in the following order: "uniform state→third state" →"third state →uniform state"→"uniform state→uniform state".

Furthermore, in general, the response time for the "uniform state→third state" transition is about 10 times to 100 times as much as the response time for the "third state→uniform state" transition. As for switching utilizing a memory characteristic, two types of switching with response times having large values are used. In light of the response time alone, it is desirable to utilize the "uniform state→uniform state" switching, but it has been considered to be unsuitable for a simple-matrix display because there is no memory characteristic.

In addition to response time, there is a problem with tilt angle. In view of memory drive suggested by Chandani et al., the optimum tilt angle is 45 degrees. However, many of the tilt angles of antiferroelectric liquid crystals hitherto synthesized are 35 degrees or less, and it is difficult to sufficiently increase the optical transmittance of a cell. If it is possible to utilize the "uniform state→uniform state" switching, the optimum tilt angle becomes 22.5 degrees, and sufficient optical transmittances can be obtained even with the antiferroelectric liquid crystals hitherto synthesized.

SUMMARY OF THE INVENTION

Accordingly, the object of the present invention is to provide a method for driving an antiferroelectric liquid crystal cell which is suitable for a simple-matrix display and in which a "uniform state→uniform state" switching can be utilized.

The object of the present invention is attained by a method for driving an antiferroelectric liquid crystal cell with an antiferroelectric liquid crystal or antiferroelectric liquid crystal composition held between a pair of substrates having electrodes, characterized in that when threshold voltages for the transitions from a third state to uniform states are $V_1$ and $-V_1$ and those for the transitions from the uniform states to the third state are $V_2$ and $-V_2$, a voltage of at least $V_1$ (or at most $-V_1$) is first applied to perform switching from the third state to a uniform state, whereupon holding voltage $Vk$ in the range of $-V_2 < Vk < V_2$ is applied within a memory time for a "uniform state→third state" switching to retain said uniform state and subsequently, a driving voltage of at least $V_1$ (or at most $-V_1$) is applied within the memory time for the "uniform state→third state" switching to select one of the uniform states, after which the application of said holding voltage and driving voltage is repeatedly performed.

DETAILED DESCRIPTION OF THE INVENTION

Figure 2:
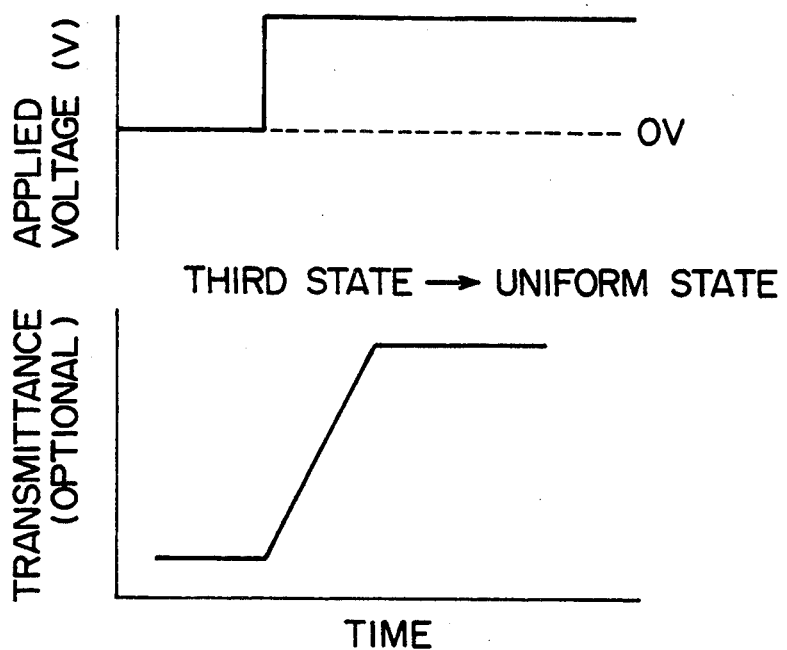
FIG. 2 is a diagram showing a change in optical transmittance in the case of switching from the third state to a uniform state in an antiferroelectric liquid crystal cell.
Figure 3:
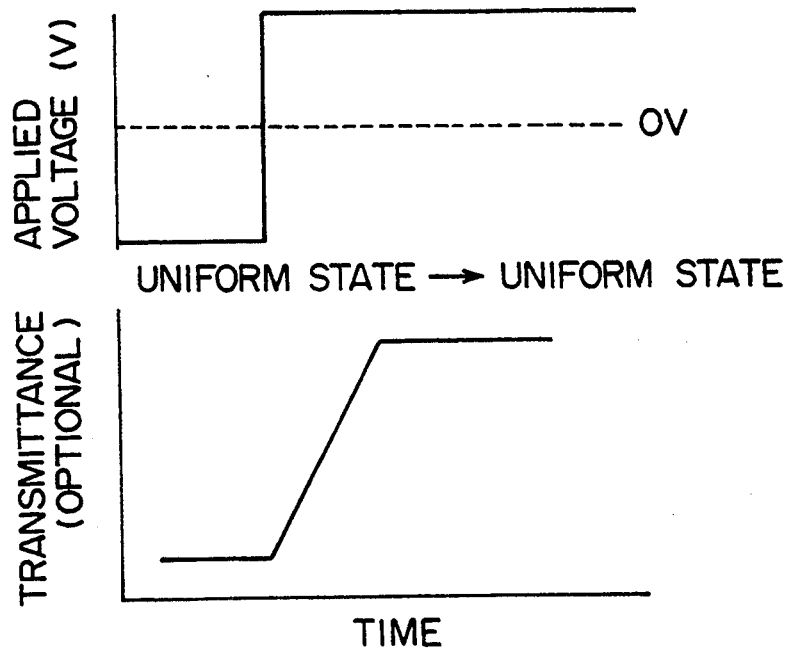
FIG. 3 is a diagram showing a change in optical transmittance in the case of switching from a uniform state to another uniform state in an antiferroelectric liquid crystal cell.
Figure 4:
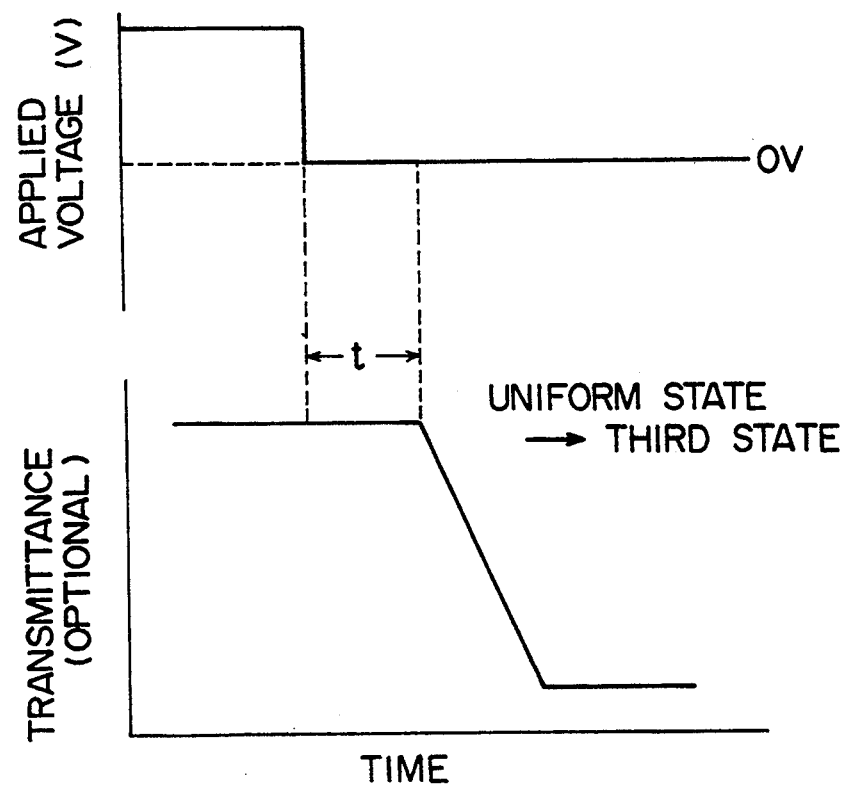
FIG. 4 is a diagram showing a change in optical transmittance in the case of switching from a uniform state to the third state in an antiferroelectric liquid crystal cell.

An antiferroelectric liquid crystal is capable of performing three types of switching as mentioned above. That is, they are "third state→uniform state", "uniform state→third state" and "uniform state→uniform state" switchings. Typical changes in optical transmittance in these types of switching are shown in FIGS. 2, 3 and 4.

Figure 5:
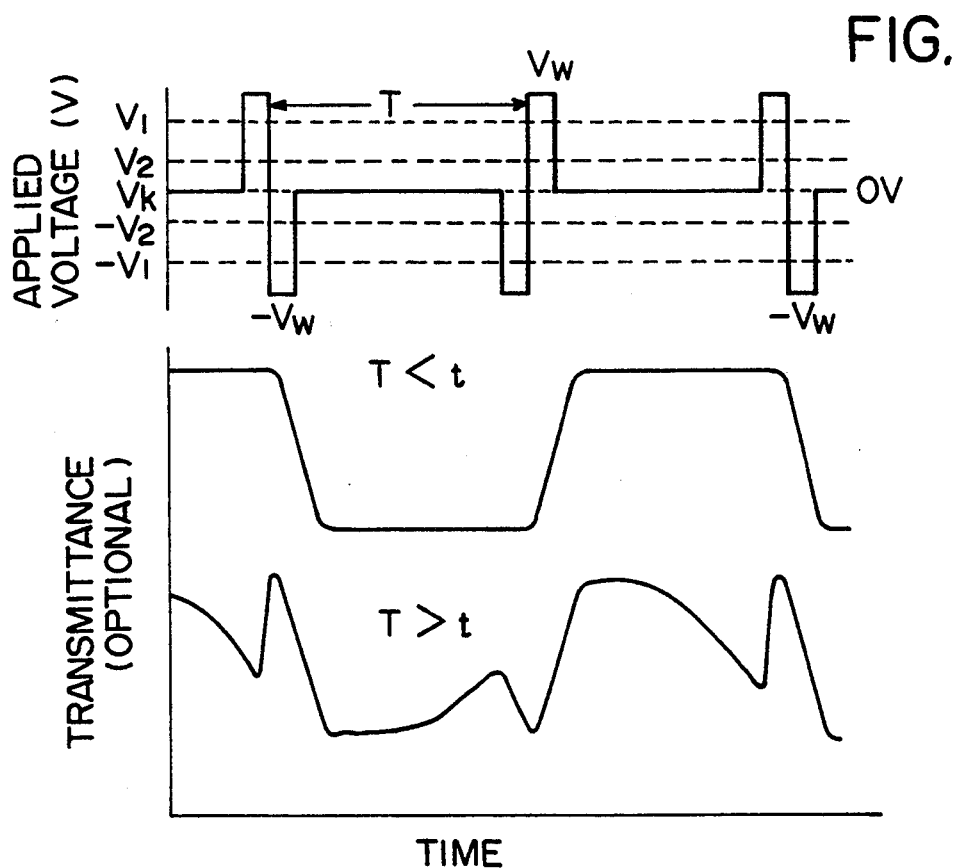
FIG. 5 is a diagram showing changes in optical transmittance in the case of pulsed voltage application to an antiferroelectric liquid crystal cell.

A change in optical transmittance in the "uniform state→third state" (FIG. 4) switching greatly differs from changes in optical transmittance in the other two types of switching. That is, in the "third state→uniform state" (FIG. 2) and "uniform state→uniform state" (FIG. 3) switchings, a change in optical transmittance usually occurs with a change in applied voltage. In contrast, in the "uniform state→third state" (FIG. 4) switching, there is no change in optical transmittance for a certain period of time "t"(memory time) even if a change in applied voltage occurs, and a change in optical transmittance generally occurs after the period of time "t" (Japanese Journal of Applied Physics, Vol. 29, pp. L107-L110, 1990). In other words, it can be considered that the "uniform state→third state" (FIG. 4) switching has a memory characteristic only for the period of time "t." The application of said driving voltage in a cycle shorter than this memory time enables drive utilizing the "uniform state→uniform state" switching with a memory characteristic. The present invention can be put into practice, for example, by applying voltage having the waveform as shown in FIG. 5 to a cell. In this case, voltage $Vw$ greater than threshold voltage $V_1$ and voltage $-Vw$ smaller than threshold voltage $-V_1$ are applied as driving voltage. Also, the holding voltage $Vk$ is set at 0V. If a frame time (indicated by T) is shorter than the memory time "t," the "uniform state→uniform state" switching with a memory characteristic can be performed.

In the case of using antiferroelectric liquid crystal cells, for example, for a liquid crystal display, polarizing plates are disposed such that one uniform state becomes dark and the other uniform state becomes bright. A look at one pixel in this liquid crystal display will reveal that it is not that the dark and bright states are always shown alternatively. In other words, the bright and dark states are shown according to pictures to be displayed. Therefore, the present invention does not imply that the "uniform state→uniform state" switching is always performed. Comparing the invention to a liquid crystal display, it implies that one uniform state is used as a dark state and the other uniform state as a bright state.

Figure 1:
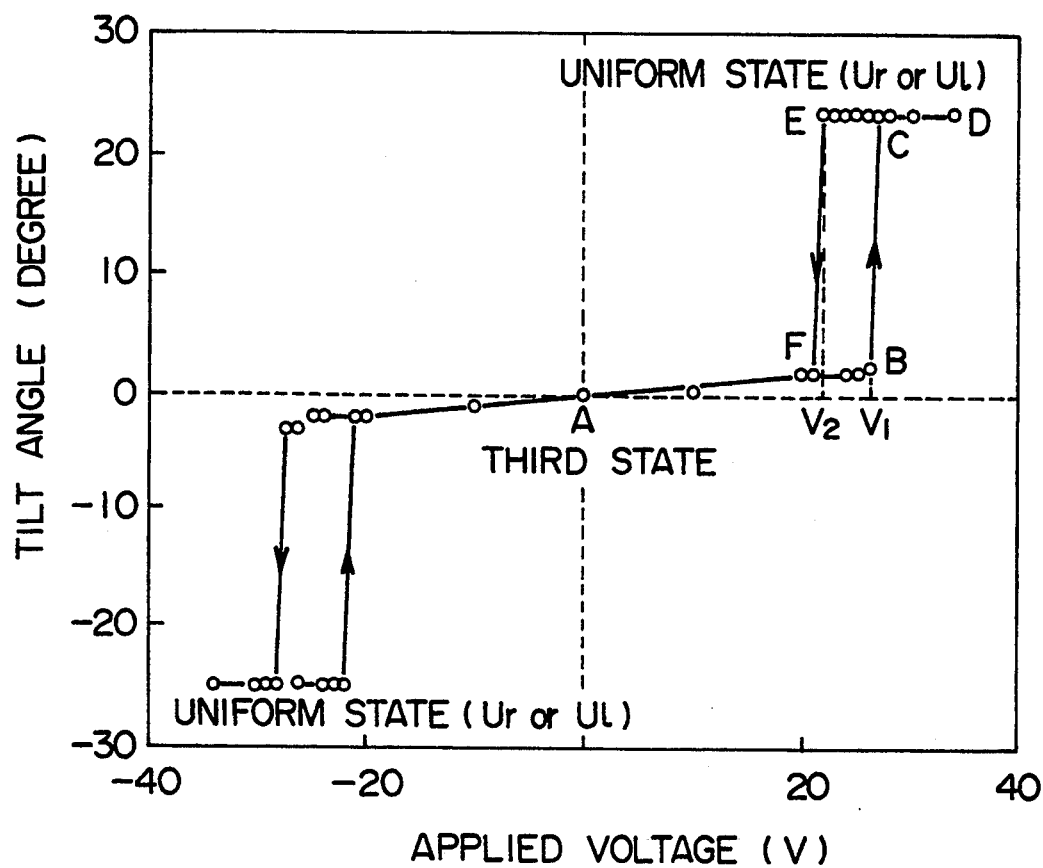
FIG. 1 is a diagram showing the relationship between tilt angle and applied voltage in the case of aN antiferroelectric liquid crystal.

The antiferroelectric liquid crystal cell differs from a conventional SSFLC cell in terms of the following points. In the antiferroelectric liquid crystal cell, there is no direct relationship between its helical structure and bistable state. That is, in the case of the antiferroelectric liquid crystal cell, even if the cell gap is made small so that its helical structure becomes lost, the third state is stable and two bistable uniform states do not manifest themselves. In order to make a uniform state appear in the antiferroelectric liquid crystal cell, it is necessary to apply voltage equal to or greater than the threshold voltage ($V_1$) as shown in FIG. 1, to the cell. Also, the uniform state once made appear can be changed back to the third state by shutting off the voltage applied to the cell.

As stated in the foregoing, according to the present invention, it is possible to achieve the driving of an antiferroelectric liquid crystal cell which is suitable for a simple-matrix display because of its capability of performing switching with a memory characteristic between two uniform states, which is bright because of a sufficient optical transmittance, as compared with a conventional antiferroelectric liquid crystal cell utilizing "third state→uniform state" and "uniform state→third state" switchings, and which has an excellent high-speed response characteristic for the switching between the two uniform states.

The present invention will be explained in further detail hereunder on the basis of an example, but the present invention is not restricted thereto.

EXAMPLE 1

After a pair of glass substrates with ITO electrodes was subjected to polyimide coating, only one of the pair substrates was subjected to rubbing treatment. The pair of glass substrates was combined into a test cell through the aid of a spacer having a particle diameter of 1.6 μm. The cell had a cell gap of 2 μm. As an antiferroelectric liquid crystal, 4-(1-trifuluromethyl-6-ethoxyhexyloxycarbonylphenyl) 4'-decylbiphenyl-4-carboxylate was used. The structural formula and phase transition temperatures (°C.) of this compound are as follows:

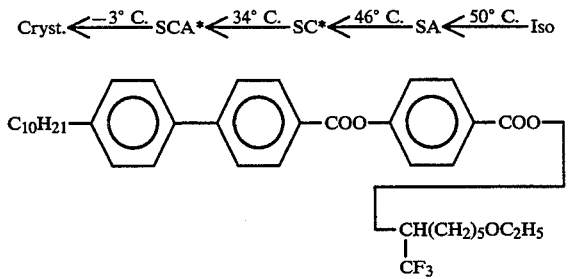

In the above figure, Iso, SA, SC* and SCA* indicate an isotropic phase, a smectic A phase, a chiralsmectic C phase and a chiralsmectic CA phase (antiferroelectric phase), respectively.

Figure 6:
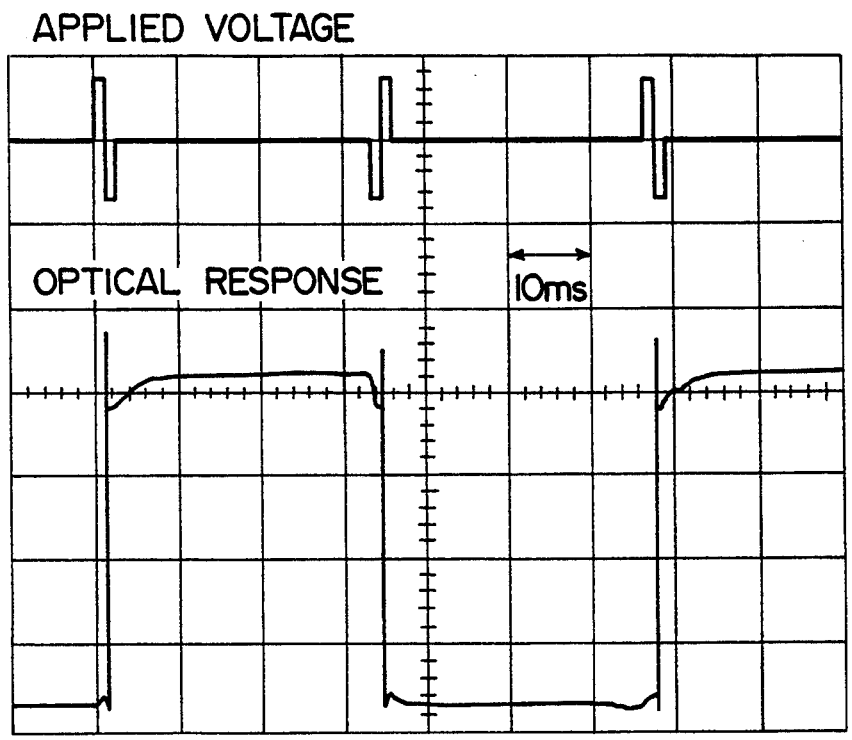
FIG. 6 is a diagram showing the relationship between applied voltage and a change in optical transmittance in example 1.

The liquid crystal was heated until it exhibited an isotropic phase, and was poured into the test cell by capillarity. After that, the test cell was gradually cooled down to 25° C. The test cell was disposed in a crossed polarizer in such a manner as to make the direction of a director in one uniform state identical with the direction of an analyzer or polarizer. Voltage (±35V, a pulse length of 1 ms) having the waveform as shown in an upper portion of FIG. 6 was applied for drive to this test cell, and light passing through this test cell was detected by means of a photomultiplier. As a result, changes in optical transmittance shown in a lower portion of FIG. 6 were observed. It is perceived from this result that even in an antiferroelectric liquid crystal cell, a "uniform→uniform" switching with a memory characteristic can be performed.

What is claimed is:

1. A method for driving an antiferroelectric liquid crystal cell with an antiferroelectric liquid crystal or antiferroelectric liquid crystal composition held between a pair of substrates having electrodes, wherein when threshold voltages for the transitions from a third state to uniform states are $V_1$ and $-V_1$ and those for the transitions from the uniform states to the third state are $V_2$ and $-V_2$, a voltage of at least $V_1$ or at most $-V_1$ is first applied to perform switching from the third state to a uniform state, a voltage $V_k$ in the range of $-V_2 < V_k < V_2$ is applied during a memory time period for a uniform state→third state switching to retain said uniform state and subsequently, a driving voltage of at least $V_1$ or at most $-V_1$ is applied within said memory time period for the uniform state→third state switching to select one of the uniform states, after which the application of said voltage $V_k$ and said driving voltage is repeatedly performed.

2. The method of claim 1 wherein said cell has dark and transmissive states as uniform states.

3. The method of claim 1 wherein said voltage $V_k$ is 0 voltage.

4. A method for driving an antiferroelectric liquid crystal cell with an antiferroelectric liquid crystal or antiferroelectric liquid crystal composition held between a pair of substrates having electrodes, wherein when threshold voltages for the transitions from a third state to uniform states are $V_1$ and $-V_1$ and those for the transitions from the uniform states to the third state are $V_2$ and $-V_2$, a voltage of at least $V_1$ or at most $-V_1$ is first applied to perform switching from the third state to a uniform state, a 0 voltage is applied during a memory time period for a uniform state→third state switching to retain said uniform state and subsequently, a driving voltage of at least $V_1$ or at most $-V_1$ is applied within said memory time period for the uniform state→third state switching to select one of the uniform states.

5. The method of claim 4 wherein after the driving voltage is applied within the memory time period for the uniform state→third switching to select one of the uniform states, said driving voltage is repeatedly performed.

6. The method of claim 4 wherein said cell has dark and transmissive states as uniform states.

7. A method for driving an antiferroelectric liquid crystal cell with an antiferroelectric liquid crystal or an antiferroelectric liquid crystal composition held between a pair of substrates having electrodes, said cell having dark and transmissive states as uniform states, wherein when threshold voltages for the transitions from a third state to uniform states are $V_1$ and $-V_1$ and those for the transitions from the uniform states to the third state are $V_2$ and $V_2$, a voltage of at least $V_1$ or at most $-V_1$ is first applied to perform switching from the third state to a uniform state, a 0 voltage is applied during a memory time period for a uniform state→third state switching to retain said uniform state and subsequently, a writing pulsed voltage of at least $V_1$ or at most $-V_1$ is applied to the said cell in a period shorter than the memory time period (t), which starts just after the said voltage being turned off, for the uniform state→third state switching.

* * * * *